United States Patent
Cobble

(10) Patent No.: US 6,371,009 B1
(45) Date of Patent: Apr. 16, 2002

(54) STRUCTURAL MATRIX FOR A PISTON AND CONNECTING-ROD ASSEMBLY

(76) Inventor: Daniel L. Cobble, 3401 Lesway Ct., #12, Louisville, KY (US) 40220

( * ) Notice: Subject to any disclaimer, the term of this patent is extended or adjusted under 35 U.S.C. 154(b) by 0 days.

(21) Appl. No.: 09/386,021

(22) Filed: Sep. 7, 1999

Related U.S. Application Data

(63) Continuation-in-part of application No. 08/969,305, filed on Nov. 13, 1997, now Pat. No. 6,062,733.

(51) Int. Cl.[7] ................................................. F16H 1/04
(52) U.S. Cl. ....................................... 92/239; 74/579 E
(58) Field of Search ........................... 74/579 E; 92/187, 92/239

(56) References Cited

U.S. PATENT DOCUMENTS 1,981,609 A  * 11/1934  Berland .................... 74/579 E
3,338,113 A  *  8/1967  Camp et al. ............... 74/579 R
3,815,431 A  *  6/1974  Alvarez .................... 74/579 E
4,691,590 A  *  9/1987  Geringer et al. .......... 74/579 E

* cited by examiner

Primary Examiner—F. Daniel Lopez
(74) Attorney, Agent, or Firm—Stites & Harbison, PLLC

(57) ABSTRACT

The present invention, being a continuation-in-part of the Reinforced Wrist-pin, makes use of a traversing reinforcing matrix for the non-mechanical surfaces of the piston and connecting-rod components' assembly. Interposing holes, or spacial impressions, within the non-contacting surface planes of such components with reinforcing members formed within such holes, for providing supplemental structural strength, as the multitude of these holes reduce overall component weight for improved efficiency of mechanical operation. For a certain configuration of the surfaces the spacial impressions are through-pass openings within the component. For another configured condition, they only recede a certain distance. Also, a specific surface condition has vertical and horizontal reinforcement members, as another condition only has horizontal members. Cumulatively, these reinforced holes provide effective weight reduction for the force transmitting assembly without compromising structural strength.

4 Claims, 4 Drawing Sheets

STRUCTURAL MATRIX FOR A PISTON AND CONNECTING-ROD ASSEMBLY

CROSS-REFERENCE OF RELATED DOCUMENTS

This application is a continuation-in-part of co-pending application Ser. No. 08/969,305, filed on Nov. 13, 1997.

FIELD OF THE INVENTION

The present invention applies to the general equipment fields of engines, compressors and pumps. More specifically, the present invention is of the force-transmitting components that develop compression or fluid forces within such equipment.

BACKGROUND OF THE INVENTION

The present invention, also known as A Structural Matrix For A Piston and Connecting-rod Assembly, concerns the further development of a structural matrix for reducing the weight of force-transmitting components within compression generating equipment, such as fossil fueled engines and compressors. The structural matrix may also be incorporated with the components of pumps and hydraulic systems.

The structural matrix is a continuation-in-part of the co-pending Reinforced Wrist-pin, application Ser. No. 08/969,305. The reinforced wrist-pin utilizes inside, traversing, reinforcement members to bolster its structural strength, so that the wrist-pin's outer wall may be notably thinner for less weight while retaining overall comparable strength. Although the structural matrix has the very similar configuration as the moving, mechanical surface of its wrist-pin counterpart, it is now configured to include the "material intervention" of the traditional non-mechanical surfaces of the piston and connecting-rod, hence, resulting in cumulative weight reduction for providing further efficiency function for the force-transmitting assembly.

Industry motivation for lighter-weight components is consistent with contemporary environmental demands that air pollution emissions from equipment be reduced.

Therefore, what is desired is further utilization of a weight-saving reinforcement structure that will continue to avail help for cleaner air and an overall healthier environment.

INVENTION SUMMARY

For this summary the present invention will be referred to as a: structural matrix; as the present invention is formally entitled: A Structural Matrix For A Piston And Connecting-Rod Assembly.

The structural matrix comprise reinforced interposing holes, being open spaces, formed physically within the non-contacting surfaces of the piston and/or connecting-rod component, for reducing the material mass component, for reducing the material mass of these components. "Non-contacting surfaces" are defined as those surfaces that do not operatively contact another component, such as the circular skirt wall of a piston and the arm/shank of a connecting-rod. These open spaces extend a predetermined depth within the component surface, which may include extending completely through the component as through-pass openings. Hence, weight is reduced for the component so that the equipment performs with higher energy efficiency. Furthermore, the more abundant the holes within a surface, then obviously, more weight is reduced for even further efficiency.

Therefore, if these open spaces are circular in shape, and if they are traversed horizontally and/or vertically with reinforcing structural members, then the overall strength of the structural matrix becomes exponential, and therefore, these reinforced holes may be positioned closer together for such higher abundance. Furthermore, for optimum strength, these structural members may be formed into the component surface as a one-piece assembly.

The reason for this higher strength is that the compression load, such as is exerted upon a piston, equalizes along the circular shape of the hole. And, when a horizontal structural member traverses a circle-shaped open space, for dividing it into essentially mating half circles, the circular shapes become "compressive," being equal to the compression strength of the surface material. However, the overall strength of the structural matrix becomes equal to the "maximum" tensile strength of the surface material because tensile load stresses are "felt" along the horizontal structural member. In other words, the structural matrix is "tensive" in regards to load tolerance, thus being equal to the tensile strength of the structural member's composed material.

For the surface area having comprehensively simple right-angle asymmetry, such as the traditional arm/shank of the connecting rod, the half-circle open-spaced configuration function as though the surface area has "invisible, weightless mass," because tensile strength of the overall component is not compromised even though the component has respectively less mass in accordance with the number of holes.

Yet, although this semi-circle configuration may be "structurally suited" for the connecting-rod, for the more complex shape of the continuous laterally curved plane of a piston skirt-wall, a vertical reinforcing structural member should traverse the horizontal member, and thus, dividing the circle shaped open space into four quarters. This feature adds further "compressional strength" to the hole, thus aiding the tensile load tolerance, in regards to the open space's inside beveled shape, as formed by the piston. But again, even these quartered open spaces constitute invisible mass for the piston, due to the reasons described above.

Still yet, the structural matrix may comprise other spacial impressions that are not circular in shape, such as essentially square or hex shapes. Of course, since other shapes do not inherently possess the equalized compression characteristic of the essentially circular shape, they may still include structural reinforcing members that significantly bolster their strength. For example, a square-shaped hole may have two structural members that traverse diagonally to the four corners, for optimum strength. Hence, the advantage of this particular configuration is that it provides even more open space, per hole, than the circular hole, for further reduced weight. And, although the square-shaped hole would have less structural strength than its circular counterpart, it may be used for pistons and/or connecting-rods that do not require quite such higher strength.

Therefore, the selected configuration of the structural matrix depends on the application and load requirement of the force-transmitting assembly. In conclusion, the present invention provides further latitude for equipment designers to build efficiency sophistication into today's equipment.

LIST OF ILLUSTRATIONS

DETAILED DESCRIPTION OF PREFERRED EMBODIMENTS

Figure 1:
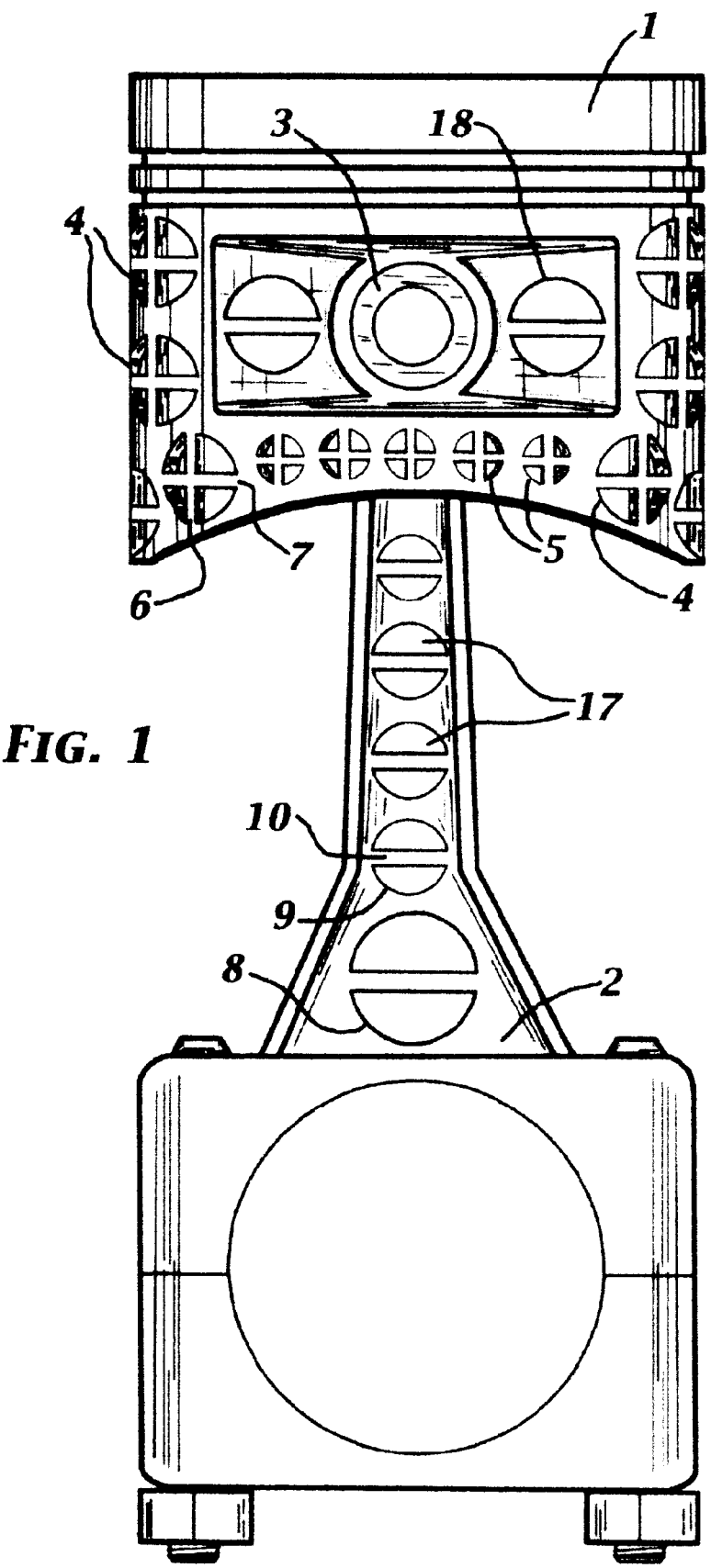
FIG. 1 is a composite view of a piston and connecting-rod assembly showing through-pass interposing holes.

FIG. 1 shows a composite view of a piston and connecting-rod assembly with the present invention, being a structural matrix of interposing holes. Piston 1 is attached to connecting-rod 2 with wrist-pin 3. Said connecting-rod has multiple said holes as depicted by 8 and 9 of different sizes, in which said sizes depend on the available surface area, thereof. Horizontal reinforcing structural member 10 divides hole 9 into mating semi-circles to also represent the other holes of said connecting-rod; and said spacial impressions of said connecting-rod, as shown, are through-pass openings within said connecting-rod, as depicted by 17, in which the open-spaced depth of said holes extend completely through said connecting-rod. Also, said structural member 10 is shown integrated with said connecting-rod as a one piece component and is representative of all other said structural members, thereof. Said piston 1 has multiple holes as depicted by 4, 5, and 18 being of different sizes in accordance with the available surface area of said piston, and each of the holes of said piston has a horizontal reinforcing structural member as depicted by 7 and a vertical reinforcing structural member for some holes as depicted by 6. Such as said connecting-rod, these holes of said piston extend through said piston as through-pass openings and are also formed with said piston as a one-piece component.

Figure 2:
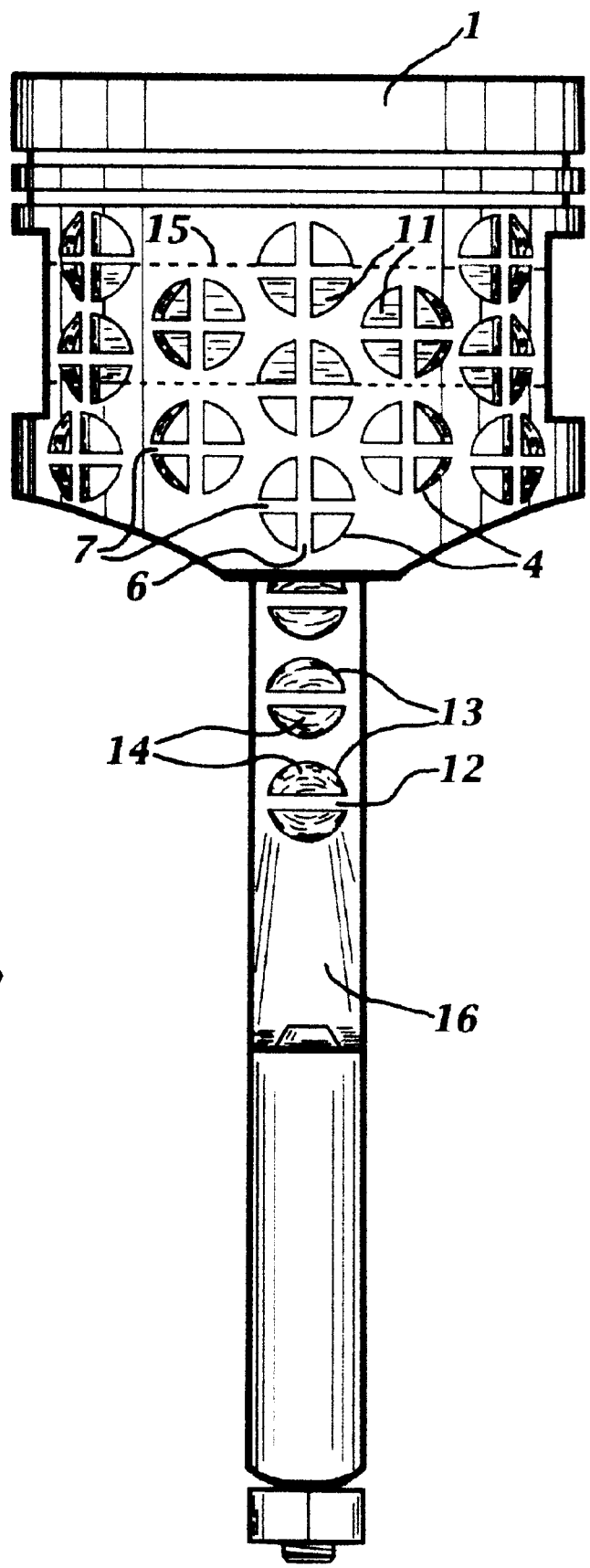
FIG. 2 is a composite view of the assembly in FIG. 1 that is rotated horizontally by 90° with a respective side view of the connecting-rod with holes of a predetermined depth.

FIG. 2 is another composite view of the piston and connecting-rod assembly rotated horizontally by 90° to show the continued array of holes 4, and too, having the same horizontal reinforcing structural members 7 and vertical reinforcing structural members 6. Parallel dotted lines 15 depict lateral placement of the wrist-pin within said piston, and the surface area of said wrist-pin can be seen through the respective through-pass openings of the holes of said piston, as depicted by 11. FIG. 2 also respectively shows a side view of connecting-rod 16 to show holes as depicted by 13 on a same side of non-contacting surface. Horizontal structural members, as depicted by 12, are shown to divide the holes into semi-circles, and said members of 12 form with said connecting-rod as a one-piece component Said holes of said 13 show the predetermined depth 14 of said holes of 13 that are not through-pass openings within said connecting-rod.

Figure 3:
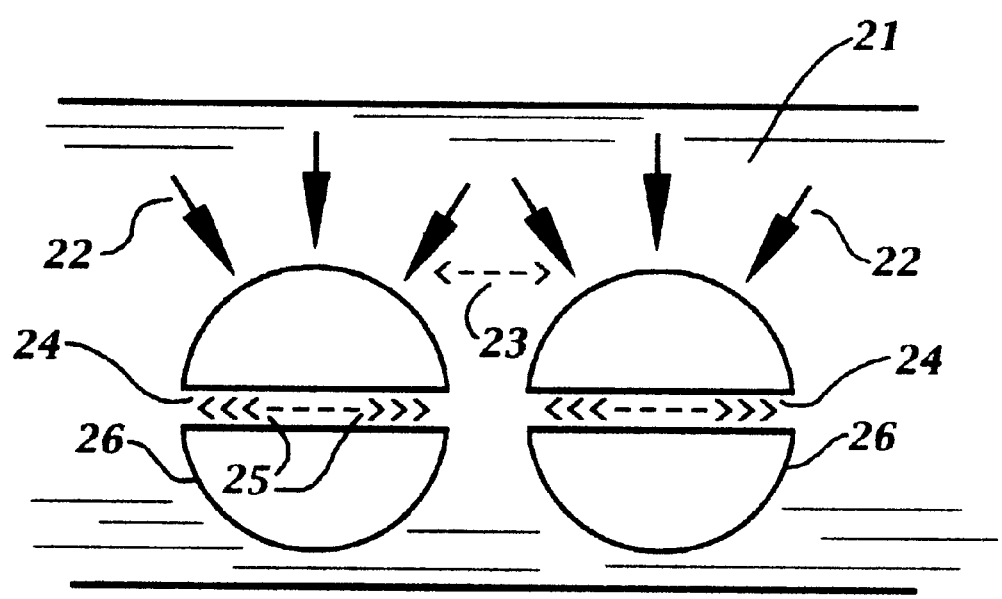
FIG. 3 shows a simple illustrative stress analysis of two half-circled holes.

FIG. 3 is a simplified depiction of compression-force stresses with arrows 22 and tensile-force stresses with dual-point stress arrows 25 of component fragment 21, exerted upon two circular-shaped holes 26 being halved by horizontal reinforcing members 24, for mating semi-circles. Said arrows 22 show how compression-force stresses equally spread around the circular edge of the holes, as opposing-force dual arrows 23 depict the direction of how compression-force stresses of the respective holes move away from each other; this "exclusive property" retains the strength integrity of the hole edges and is why the circular-type structural matrix is the strongest of any other shaped structural matrix. As compression stresses are exerted upon the respective circular shapes, said tensile stresses tend to spread outward and away from the center of said horizontal structural members 24 due to the respective tensile load exerted from the center-point, thereof, as depicted by the dotted lines of said stress arrow 25, for eventual breakage if said compression stresses exceed the tensile load tolerance of said member 24.

Figure 4:
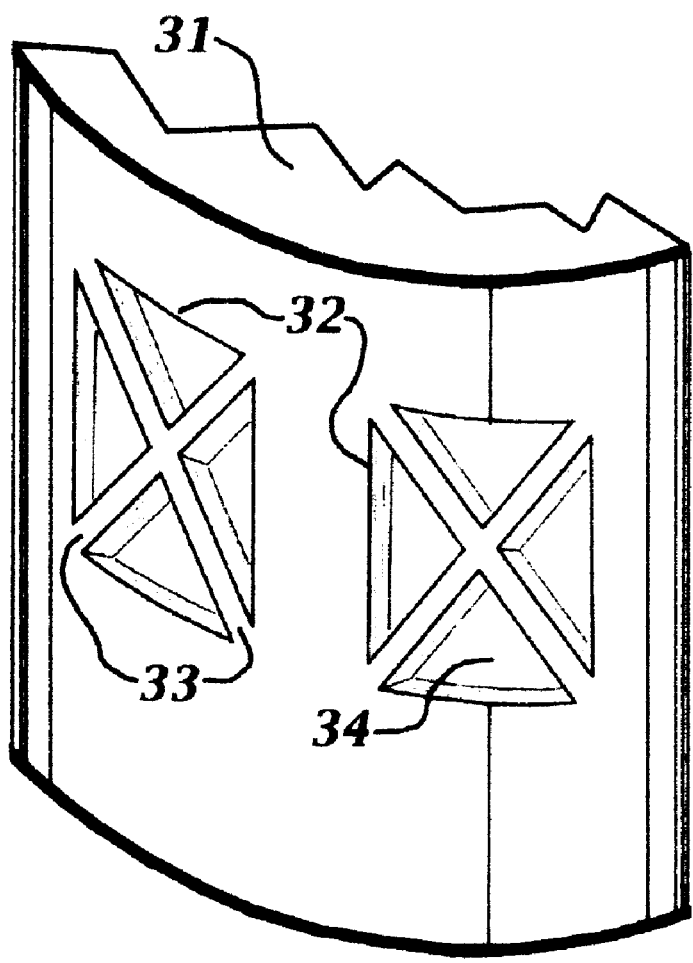
FIG. 4 shows a piston component fragment of essentially square-shaped holes with two diagonal reinforcing structural members that traverse each other.

FIG. 4 shows the circular shape of a piston component fragment 31 having a structural matrix of essentially square-shaped holes 32. Diagonally positioned reinforcing structural members 33 traverse each other for reinforcement contact at the four corners of said holes 32. Through-pass opening 34 depict the predetermined depth of said holes 32 as through-pass openings of said component fragment 31.

What I claim is:

1. A connecting rod comprising a non-contacting surface which does not operatively contact another component surface; a plurality of through-pass interposing holes formed in said non-contacting surface; and a traversing, reinforcing structural member within each of said through-pass interposing holes and extending from a first edge of said interposing hole to a second edge of said interposing hole.

2. The connecting rod of claim 1 and further comprising a second reinforcing structural member in at least one of said through-pass interposing holes.

3. A connecting rod comprising a non-contacting surface which does not operatively contact another component surface; a plurality of interposing holes formed on a same side of said non-contacting surface; and a traversing, reinforcing structural member within each of said interposing holes and extending from a first edge of said interposing hole to a second edge of said interposing hole.

4. The connecting rod of claim 3 and further comprising a second reinforcing structural member in at least one of said through-pass interposing holes.

* * * * *